US007002311B2

(12) United States Patent
Strike et al.

(10) Patent No.: US 7,002,311 B2
(45) Date of Patent: Feb. 21, 2006

(54) MOTOR SPEED SENSOR ADVANCEMENT EMULATION AND COMPENSATION

(75) Inventors: Nigel Strike, Phoenix, AZ (US); Carl Brewer, Chandler, AZ (US)

(73) Assignee: Minebea Co., Ltd., Tokyo (JP)

( * ) Notice: Subject to any disclaimer, the term of this patent is extended or adjusted under 35 U.S.C. 154(b) by 0 days.

(21) Appl. No.: 10/803,328

(22) Filed: Mar. 18, 2004

(65) Prior Publication Data

US 2005/0206335 A1 Sep. 22, 2005

(51) Int. Cl.
*H02P 6/12* (2006.01)

(52) U.S. Cl. .................................. 318/439; 318/254

(58) Field of Classification Search ................ 318/138, 318/254, 439, 720–724

See application file for complete search history.

(56) References Cited

U.S. PATENT DOCUMENTS 5,168,202 A * 12/1992 Bradshaw et al. .......... 318/608
5,200,675 A * 4/1993 Woo .......................... 318/254
5,298,839 A * 3/1994 Takeda ....................... 318/254
5,757,152 A * 5/1998 Yuem ......................... 318/254
5,907,226 A * 5/1999 Ohsawa et al. ............. 318/439
6,002,234 A * 12/1999 Ohm et al. ................. 318/729
6,541,939 B1 * 4/2003 Kishibe et al. ............. 318/799

* cited by examiner

*Primary Examiner*—Bentsu Ro
(74) *Attorney, Agent, or Firm*—Pillsbury Winthrop Shaw Pittman LLP

(57) ABSTRACT

A microcontroller emulates advancement of a speed sensor for a motor, rather than having a physical movement of the speed sensor. The microcontroller calculates an advancement time based on the motor's efficiency. The microcontroller measures a motor speed utilizing a tachometer signal transmitted from the speed sensor. The microcontroller subtracts the emulated advancement time from the motor speed to generate a commutation countdown time. The microcontroller switches or commutates outputs when the commutation countdown time has elapsed. The microcontroller measures an actual advance time, which is a time between the commutating of the outputs and a receipt of the next speed sensor interrupt. The microcontroller calculates an anticipated motor speed by adding the actual advance time to the commutation countdown time.

30 Claims, 8 Drawing Sheets

MOTOR SPEED SENSOR ADVANCEMENT EMULATION AND COMPENSATION

BACKGROUND OF THE INVENTION

1. Technical Field

The present invention relates to motors for driving devices, e.g., cooling fans. More particularly, the present invention relates to motors for driving devices, e.g., cooling fans, for use in electronic systems and for software emulation and compensation within the driven devices to achieve efficient operation.

2. Discussion of the Related Art

In electronic systems, such as computer systems, cooling fans play an important role in maintaining the system's capabilities. The inability to remove excessive heat from electronic systems may lead to permanent damage of the system. Because of the complexity of existing electronic systems, cooling fans have added functionalities other than just providing cooling air, such as the ability to control the speed of a fan, the ability to monitor a tachometer pulse on a fan to determine instantaneous fan speed, and the ability to detect if a fan has failed or is slower than its preset speed.

Brushless D.C. motors, utilized today in electronic devices such as personal computers, servers, laptops, and desktop computers, include a rotating permanent magnet rotor, a stator carrying field coils, and a drive circuit for sequentially exciting the field coils with digital pulses, thereby creating electronic commutation. Electronically commutated motors eliminate or reduce the disadvantages inherent in motors with mechanical structures for a commutator. Specifically, radio frequency interference losses and electromagnetic induction (EMI) losses are reduced or eliminated. Power consumption attributed to armature-brush arcing is also eliminated.

The electronic driving circuitry incorporates active electronic components such as MOSFETs, to provide pulse width modulated signals. Drive pulse generation is synchronized with rotor position by the incorporation of monitoring or feedback circuitry, including the use of position sensors, such as Hall effect devices. In a cooling fan, a circuit board may include a position sensor, such as a hall effect sensor, a rotor, a stator, and a microcontroller.

A DC brushless motor may include a driving circuit based on an integrated circuit that is soldered to the printed circuit board. The printed circuit board is contained inside a motor casing together with the stator and the rotor. The rotor, supported by bearings, may thus be propelled inside the stator to produce mechanical rotation under control of the electronic driving circuitry. A stator is comprised of a selected number of turns of conductor coils wound around a bobbin reel.

In operation, the stator field winding acts as an electromagnetic source that produces magnetic flux as a result of the excitation current it receives. The generated magnetic flux flows in a longitudinal direction of the generally cylindrical-shaped body of the stator along the magnetic circuit inside the upper and lower magnetic pole pieces, which are located at both ends of the stator cylindrical body. The magnetic flux flows either into or out from the pole plates of the pole pieces respectively and then into or out from the rotor. Depending on the polarity of the current excitation in the stator field windings, the flux passes across an air gap in the radial direction either to or out from the corresponding magnetic poles in the ring magnet of the rotor. As the magnetic flux passes through closed loops of magnetic circuits formed in the stator, the air gap and the rotor, mechanical driving force is developed and the rotor is propelled to rotate.

Depending on the relative angular position of the rotor, the drive circuit alternatively feeds driving current of clockwise or counter-clockwise orientation into the stator field winding. As a result, the pole plates and the upper and lower magnetic pieces respectively may become alternatively energized as north and south poles respectively. With proper driving control, the rotor can thus be propelled to rotate by the stator in the desired direction and speed of rotation.

Apparatus for sensing angular position and speed of a rotary shaft have moved to utilizing less expensive components. Hall sensors and magnorestrictive sensors may be utilized to generate electrical signals when exposed to a rotating magnetic field. Hall effect sensors utilize a current-carrying semiconductor membrane to generate a low voltage perpendicular to the direction of current flow when subjected to a magnetic field normal to the surface of the membrane. The rotation of the rotor's magnetic field is detected by, for example, a Hall sensor (Hall generator circuit) which senses the rotor position and speed and provides synchronizing pulses.

If a hall sensor is placed in a neutral position, as illustrated in FIG. 1(*a*), the fan does not run efficiently and in some cases may not be able to reach the higher speeds required to cool the electronics or computing device enclosure. In order to combat this inefficiency, the hall sensor may be physically moved to an advanced position, as illustrated in FIG. 1(*b*), so that the hall sensor is activated slightly before the pole pass. The hall sensor interrupt is sent to a microcontroller, and the microcontroller switches the outputs, slightly before the magnet passes the actual pole. The switching of outputs is referred to as switching or commutation. This allows the fan to reach the higher speeds and operate in an efficient manner.

The amount of advancement of the hall sensor depends on the operating speed of the motor. Conventionally, the appropriate advancement of the hall sensor is based on the maximum motor speed. Unfortunately, this means that when the speed control of the fan is being utilized and the fan is running at a lower speed than maximum, the motor is not running as efficiently as possible.

Problems arise when the hall sensor is physically advanced as described above. A permanently advanced hall sensor causes an "oscillating effect" problem on startup and also may cause a locked rotor condition. The net result of the "oscillating effect" can prevent the fan from starting up or from rotating. The "oscillating effect" is illustrated in FIGS. 1(*c*) and 1(*d*). If the hall sensor is placed in a neutral position as shown in FIG. 1(*c*), the rotational torque for the motor shaft and the hall sensor is in one direction, whether momentum is present or not. If the hall sensor is placed in an advanced position, as illustrated in FIG. 1(*d*), a negative torque and a positive torque exist. If the fan is rotating, momentum overcomes the negative torque. If there is no momentum, such as during startup, the positive and the negative torques can pull back and forth indefinitely, causing an "oscillating effect." The "oscillating effect" frequency is determined by the Gauss of the hall sensor, and could be interpreted by the microcontroller as the frequency of a running fan.

In addition, different designs of the cooling fan may result in hall placement changes. If a design of a cooling fan needs to be changed, the hall advancement angle or advancement amount from a neutral position may need to change to achieve max efficiency or desired speed. That results in a PCB layout change.

For example, if a fan is running at 4000 RPM, then the hall sensor or speed sensor may be adjusted to 3 degrees from neutral position, and the PCB is laid out to allow this position. If the same or similar fan needs to run at 6000 RPM, the PCB would need to be reconfigured to adjust the hall sensor or speed sensor to 5 degrees from neutral position for maximum efficiency. The design change or new circuit board layout results in an increase in monetary and time costs.

Accordingly, a need exists to allow the fan to operate at high speeds and to run in an efficient manner, while minimizing the "oscillating effect" and minimizing any additional costs associated with board layout changes.

BRIEF DESCRIPTION OF THE DRAWINGS

FIG. 1(*b*) illustrates an advanced placement of a hall sensor according to the prior art;

FIG. 1(*c*) illustrates a torque relationship caused by a neutral placement of a hall sensor according to the prior art;

FIG. 1(*d*) illustrates a torque relationship caused by an advanced placement of a hall sensor according to the prior art;

FIG. 3(*b*) illustrates a second embodiment of a microcontroller incorporating sensor sensor advancement emulation and compensation according to an embodiment of the present invention;

FIG. 4(*b*) illustrates a flowchart for the initialization stage for driving a motor where a tachometer signal is utilized to determine a calculated motor speed according to an embodiment of the present invention;

FIG. 5(*b*) illustrates a flowchart of an advancing emulation algorithm after an initialization stage and when a tachometer signal is utilized to determine a calculated fan speed according to an embodiment of the present invention.

DETAILED DESCRIPTION

Figure 1A:
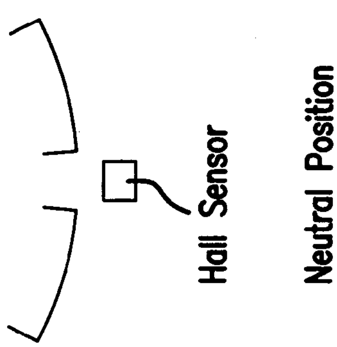
FIG. 1(*a*) illustrates a neutral placement of a hall sensor according to the prior art.
Figure 1B:
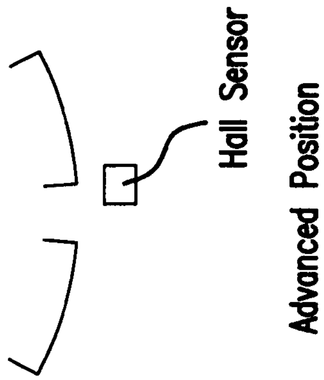
Figure 1C:
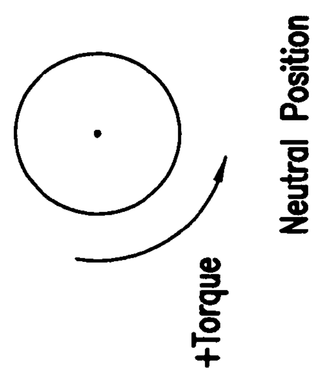
Figure 1D:
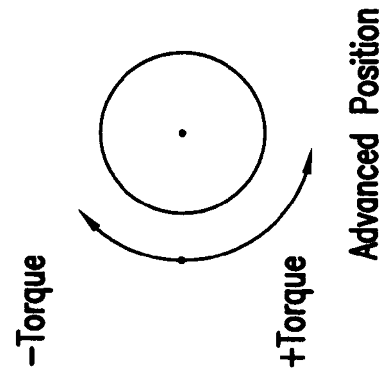
Figure 2:
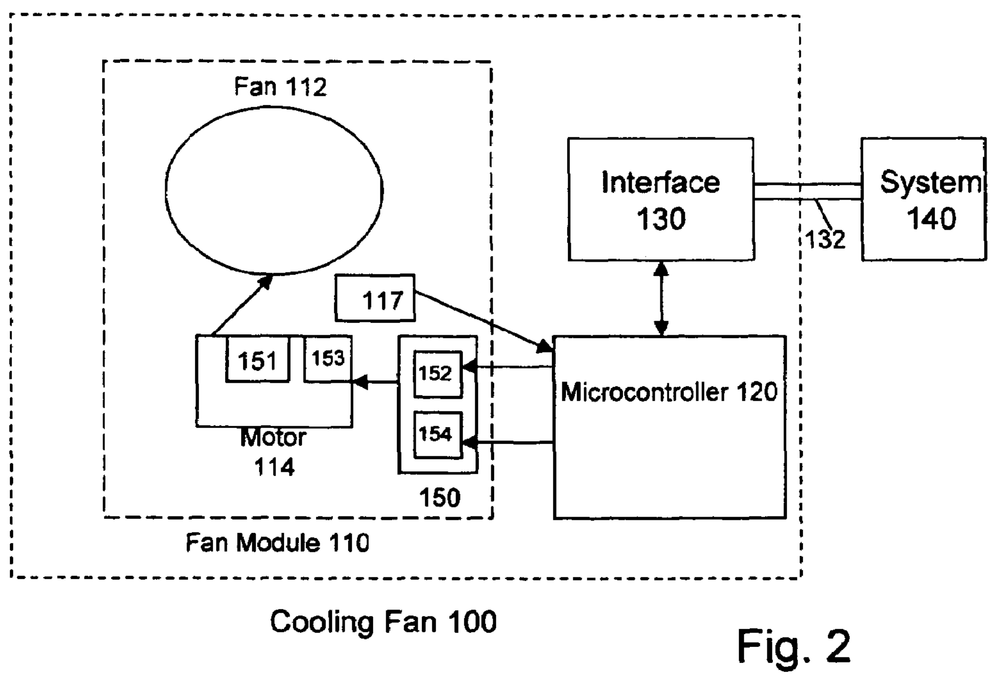
FIG. 2 illustrates a cooling fan including speed sensor advancement emulation and compensation according to an embodiment of the present invention.

FIG. 2 illustrates a cooling fan including speed sensor advancement emulation and compensation according to an embodiment of the present invention. The cooling fan 100 includes a fan module 110, which has a fan 112 (including fan blades), a motor 114 rotatably coupled to the fan 112 to drive the fan 112, and a driving circuit 150. The fan may be referred to as an impeller. The motor 114 includes a stator 151 and a rotor 153. The driving circuit 150 may include a first driver 152 and a second driver 154. A microcontroller 120, such as a PIC16C717 microcontroller device manufactured by Microchip Technology, Inc., is in direct communication with the fan module 110. Any suitable microcontroller, controller, processor, or processing device may be utilized. The microcontroller 120 may drive the motor 114 through the driving circuit 150, in a manner as described above. In other words, the microcontroller 120 may be coupled to a first driving device 152 and a second driving device 154. The first driving device 152 and the second driving device 154 in the driving circuit 150 may be coupled to the motor 114.

Although the invention is described in embodiments utilizing a motor to drive a cooling fan, the present invention may be utilized in any apparatus or device where a motor is being utilized to drive a shaft, and where a speed sensor is utilized to sense, magnetically or otherwise, a rotational speed of the shaft. In the application, a fan speed is mentioned but similarly the term "fan speed" may be replaced with the term "motor speed." Many apparatus or devices may encounter the "oscillating effect" described above due to an advancement of the speed sensor. The teachings of the present invention apply to these areas also. For example, a pump motor that moves water or another liquid through a medium may utilize the teachings of the present invention. Motors for vacuum cleaners or other small household appliances may also benefit from utilizing this technique. In addition, motors in automatic breaking systems and electronic power steering systems may benefit from the utilization of this technique.

The microcontroller 120 is preferably fixed internally within the cooling fan 100. In an embodiment of the invention, the microcontroller 120 may be directly coupled to the motor 114. In this embodiment of the invention, the functionality of the first driving device 152 and the second driving device 154 may be incorporated into the microcontroller.

A bus interface 130 is in communication with the microcontroller 120. In an embodiment of the invention, the bus interface may be an Inter-IC (I2C) bus ("I2C-Bus Specification", Version 2.1, January 2000, from Philips Semiconductors). The bus interface 130 facilitates transfer of data to and from the microcontroller 120 from outside devices such as a system 140 or another cooling fan 100 located within the same system 140. The bus interface 130 may be interconnected by bus lines 132, such as I2C bus lines, to the system 140. Illustratively, the I2C bus lines 132 have two lines: a data (SDA) line and a clock (SCL) line. Inter-IC (I2C) may be accessed serially so that each individual device utilizing the I2C protocol has a specific identification (ID), but may all be connected to the same communication line(s) or bus(es) (i.e., it may be connected as a parallel bus). Inter-IC (I2C) is a useful protocol because it is familiar to thermal design engineers who utilize cooling fans in their system designs, and a fair number of digital logic devices utilize the I2C protocol. However, any other bus interface systems and protocols may also be utilized. For example, the Controller-Area Network (CAN) protocol (Controller-Area Network (CAN) Specification, version 2.0, 1991, Robert Bosch GmbH, Stuttgart, Germany), utilized in the automotive industry, may also be utilized with the bus interface 130 according to an embodiment of the present invention.

According to an embodiment of the present invention, the microcontroller 120 is programmed with program code that enables the microcontroller 120 to read byte communications provided by a system or device 140 that utilizes, for example, the I2C protocol. In a particular embodiment of the present invention, the microcontroller 120 includes a program memory into which the program code is stored. The PIC16C717 microcontroller, for example, is capable of handling 14-bit words and has a capacity of 2 kilobytes. The program or instruction code may be programmed only once into the microcontroller 120 at the factory, and if so, it is not re-programmable or re-writeable by an end user or cooling fan customer. The PIC16C717 microcontroller, for example, also includes a small data memory, or "scratch pad memory", having a capacity of 256 bytes available to the microcontroller 120 to conduct its operations. In an embodiment of the invention, the data memory of the microcontroller 120 is volatile and does not store any programming or instructions, but rather it is only a working memory.

The cooling fan 100 and specifically the fan module 110 may include a speed sensor 117. The speed sensor 117 may be a hall sensor or a magnorestrictive sensor. In embodiments of the invention utilizing the hall sensor, the hall sensor 117 provides a signal to the microcontroller based on the positions of magnetic poles of the rotor 153 of the fan motor 114 in relation to the hall sensor. In an embodiment of the invention, the signal may be referred to as a tachometer signal. The hall sensor utilizes the hall effect, which occurs when charge carriers moving through a material experience a deflection because of an applied magnetic field. The deflection results in a measurable potential different across the side of the material which is transverse to the magnetic field and the current direction.

In an embodiment of the invention utilizing a hall sensor as the speed sensor 117, a digital hall sensor may be utilized. In an embodiment of the invention, an analog hall sensor may be utilized. In one embodiment of the invention, the hall sensor 117 may provide a 50% duty cycle signal. As the rotor (containing the permanent magnet) passes by the hall sensor, the output signal of the hall sensor 117 transitions from low to high, or from high to low, depending on the polarity of the magnet at the time of passing.

In an embodiment of the present invention, there are four stator teeth and four magnetic poles. For each complete revolution of the rotor, the hall sensor will transition four times, corresponding to the four magnetic poles on the rotor. Four transitions will generate two evenly spaced square wave pulses. This corresponds to two pulses being transmitted for each revolution of the fan. In other embodiments of the present invention, additional magnetic poles may be used. For example, the stator can utilize six stator teeth and the magnet can utilize six magnetic poles. In this embodiment, the hall sensor would transition six times for each revolution, generating three evenly spaced square wave pulses for each revolution. Based on the signal provided by the speed sensor 117, e.g., the tachometer signal, the microcontroller 120 is capable of determining the speed of the cooling fan 100.

In order to avoid the "oscillating effect" at startup, avoid the locked-rotor problem discussed above, maximize motor efficiency, and in order to minimize hall sensor placement changes due to different designs and different loads created by the fan on the motor, software code in the microcontroller 120 predicts when the drive signals from the microcontroller should be activated, switched, or commutated. In other words, software code may emulate the position of a speed sensor 117 and also compensate for the advancement in position of the speed sensor 117. Outputs from the microcontroller are switched at a commutation time, which may be before the speed sensor interrupt signal or tachometer signal is received at the microcontroller 120. In the embodiment of the invention illustrated in FIG. 2, the microcontroller 120 may switch from generating a first driving signal that is transmitted to the first driving device 152 to generating a second driving signal that is transmitted to the second driving device 154.

The commutation time is determined by subtracting a pre-determined advancing time from a calculated fan speed. The calculated fan speed is determined by the microcontroller 120 after the microcontroller 120 receives the tachometer signal and analyzes the tachometer signal generated by the speed sensor 117. In an embodiment of the invention, the calculated fan speed may have a measurement of revolutions per minute (RPM).

After the outputs from the microcontroller 120 are switched, the microcontroller 120 monitors or measures the time at which a next speed sensor interrupt is received from the speed sensor 117. In other words, in an embodiment of the invention utilizing a hall sensor, an actual advance time is measured between the time of commutation or switching and when the next hall sensor interrupt is received from the hall sensor 117.

In an embodiment of the invention, the microcontroller 120 calculates an anticipated fan speed by adding the actual advance time to the commutation time. In this embodiment of the invention, the anticipated fan speed may be utilized by the microcontroller 120 in place of the calculated fan speed. In an embodiment of the invention, the microcontroller 120 determines the calculated fan speed after the outputs have been commutated. In other words, the microcontroller 120 does not utilize the anticipated fan speed, i.e., the speed calculated using the actual advance time and the commutation time.

The microcontroller 120 utilizes the anticipated fan speed or the calculated fan speed to calculate a new commutation time for the next switching of the microcontroller outputs. For example, the new commutation time is calculated by subtracting the pre-determined advancing time from the anticipated fan speed or calculated fan speed. The pre-determined advancing time may also be referred to as the emulated advancing time. For example, the outputs of the microcontroller 120 are switched, e.g., from a second driving signal back to a first driving signal.

In the embodiment of the invention utilizing the anticipated fan speed, the microcontroller 120 measures the elapsed time between the switching of the outputs and the next speed sensor interrupt to produce the actual advance time. The new anticipated fan speed is the summation of the actual advance time and the new commutation time. This process continues as the fan continues to operate. In an embodiment of the invention utilizing the calculated fan speed, the microcontroller 120 determines new calculated fan speeds after the outputs have been commutated.

Figure 3A:
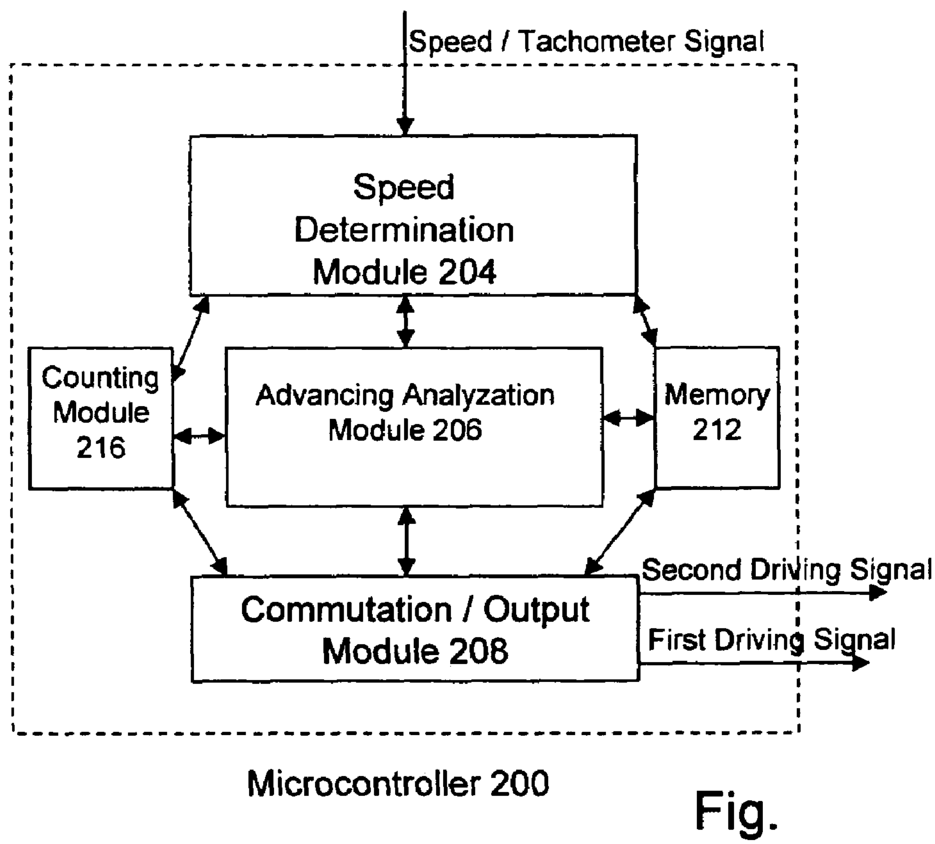
FIG. 3(*a*) illustrates a microcontroller incorporating speed sensor advancement emulation and compensation according to an embodiment of the present invention.
Figure 3B:
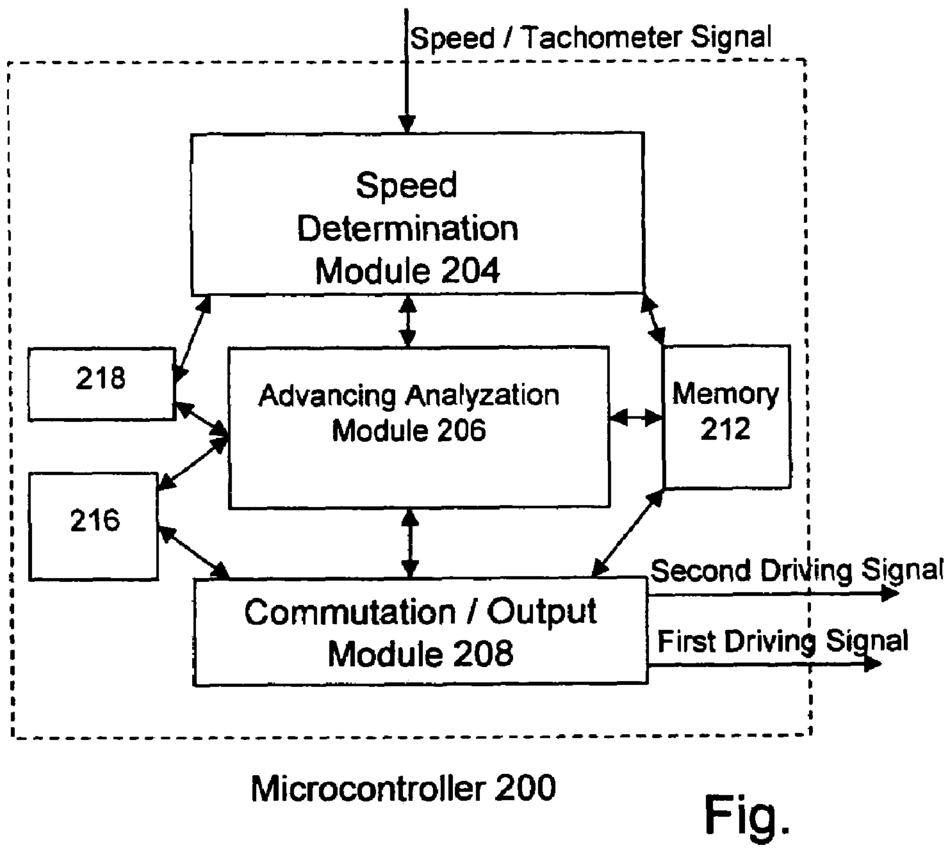

FIG. 3(*a*) illustrates a microcontroller incorporating speed sensor advancement emulation and compensation according to an embodiment of the present invention. FIG. 3(*b*) illustrates a second embodiment of a microcontroller incorporating speed sensor advancement emulation and compensation according to the present invention. The microcontroller may be utilized to send signals to drive a motor, which in turn drives another device, such as a cooling fan. For simplicity and ease of illustration, the description below refers to cooling fan speed, but the present invention applies to further embodiments of motors in which other devices are driven or rotated by the motor. The cooling fan microcontroller 200 includes a speed determination module 204, an advancing analyzation module 206, a commutation/output module 208, and a counting module 216. In an embodiment of the invention illustrated in FIG. 3(*b*), the cooling fan microcontroller may include a first counter 216 and a second counter 218. The cooling fan microcontroller 200 may include a memory 212. The counters may be implemented as timers in the microcontroller 200. The speed determination module 204, the advancing analyzation module 206, and a commutation/output module 208 may be implemented in software within the microcontroller 200.

The cooling fan microcontroller 200 may start the fan 112 (see FIG. 1). In an embodiment of the invention, a signal may enable the fan motor to be turned on from the initialization or the power-up of the system 140. In an embodiment of the invention, the microcontroller 200 may send a driving signal to the motor 114 through a driving circuit 150. In an embodiment of the invention, the microcontroller may transmit a first driving signal to cause the motor 114 to turn on or activate the fan 112.

The advancing analyzation module 206 is deactivated as the fan is initialized. In other words, the advanced analyzation module is not operating during initialization or turning on of the fan. The advance analyzation module 206 is deactivated to avoid the "oscillating effect" which is caused because when there is no momentum and the torques can pull back and forth indefinitely. After initialization, the speed determination module 204 receives the tachometer signal from the speed sensor 117 and determines the speed of the fan 112 from the tachometer signal. The speed of the fan may be referred to as the calculated fan speed.

In an embodiment of the invention, the speed determination module 204 may receive the tachometer signal and utilize the second counter 218 to determine the calculated fan speed, as illustrated in FIG. 3(*b*). For example, the speed determination module 204 may monitor the tachometer signal and notify the second counter 218 (or timer) that a pulse has been received by the speed determination module. The second counter 218 may measure the pulse time in the tachometer signal or the time between pulses in order to determine the calculated fan speed.

The speed determination module 204 continues to monitor the tachometer signal. During this time, the microcontroller 200 switches the outputs in sync with the tachometer signal interrupt. This may be referred to as "neutral switching." Once the speed determination module 204 identifies that the calculated fan speed has increased above an initial speed threshold, the advancing analyzation module 206 is activated. The microcontroller 120 may store a value of the initial speed threshold in a memory 212. The memory 212 may be a volatile or non-volatile memory. In an embodiment of the invention, the initial speed threshold may be stored in a first register. In an embodiment of the invention, the initial speed threshold may be stored in a memory address in a common microcontroller memory, such as illustrated by memory 212 in FIGS. 3(*a*) and 3(*b*).

In one embodiment of the invention, after the initial speed threshold has been reached, i.e., the calculated fan speed is greater than the initial speed threshold, the advancing analyzation module 206 emulates the advancing of a hall sensor interrupt by calculating a commutation countdown value. The commutation countdown value is calculated by subtracting an initial advancing amount from the calculated fan speed. The initial advancing amount is a value calculated to be the smallest amount of advancement possible while being large enough to overcome the microcontroller's speed sensor interrupt overhead. In an embodiment of the invention, the initial advancing amount may stored in a register. In an embodiment of the invention, as illustrated in FIG. 3, the initial advancing amount may be stored in an address in the common memory 212. In an embodiment of the invention, the initial advancing amount may be referred to as an initial emulation amount. A motor 114 operates in the most efficient manner if the current being delivered to it maintains a uniform value. In other words, a current waveform representing the current drawn by the motor should be free of spikes having large magnitudes and also should maintain a value within a narrow range of current values.

The advancing analyzation module 206 utilizes the commutation countdown value to notify the commutation/output module 208 to switch outputs, i.e., perform commutation. In an embodiment of the invention, the commutation output module 208 may switch from outputting a first driving signal to outputting a second driving signal. For example, the commutation countdown value may be transmitted to a counting module 216 (or first counting module in FIG. 3(*b*)) from the commutation/output module 208. The counting module 216 may decrement a time equal to the commutation countdown value, or let a time period corresponding to the commutation countdown period expire. After the time equal to the commutation countdown value has expired, a signal may be transmitted from the commutation/output module 208 to switch outputs. The counting module 216 may be implemented in hardware or software.

In the embodiment of the invention illustrated in FIG. 3(*a*), after commutation, or switching of the outputs, the commutation output module 208 may transmit a signal to a counting module 216 to initiate a measurement of an actual interrupt time. In an embodiment of the invention, the counting module 216 for measuring the actual advance time may be the same counting module 216 as utilized above, or it may be a physically separate counting module (not shown).

In the embodiment of the invention illustrated in FIG. 3(*a*), the speed determination module 204 receives a speed sensor interrupt from the speed sensor. The speed determination module 204 transmits a notification to the advanced analyzation module 206 identifying that the next speed sensor interrupt has been received. The advanced analyzation module 206 receives the speed sensor interrupt notification from the speed determination module 204 and notifies the counting module 216 to stop the measuring of the actual advance time. In other words, the counting module 216 is measuring an actual advance time between when the speed sensor interrupt is received and when commutation or switching of the outputs from the microcontroller occurred.

In the embodiment of the invention illustrated in FIG. 3(*a*), the advanced analyzation module 206 adds the commutation countdown value and the actual advance time to generate the anticipated fan speed. The advanced analyzation module 206 utilizes the value for the anticipated fan speed in the next iteration or next measure time of the calculation of the commutation countdown time. In an embodiment of the invention illustrated in FIG. 3(*a*) when one counting module 216 is utilized, the commutation countdown value may be retained in the counting module and then added to the measured actual advance time, which is also stored in the counting module.

In the embodiment of the invention illustrated in FIG. 3(*b*), the speed determination module 204 may receive the tachometer signal and utilize the second counter 218 to determine the calculated fan speed, after commutation has occurred. This may be utilized for the next measured time period. For example, the speed determination module 204 may monitor the tachometer signal and notify the second counter 218 (or timer) that a pulse has been received by the speed determination module 204. In this embodiment of the invention, the calculated fan speed may be utilized for the next measured time or period to determine the new commutation time.

The speed determination module 204 determines if the current advancing time is greater than a first advancing threshold. For example, the first advancing threshold may be 90 microseconds and the current advancing time may only be 30 microseconds. If the speed determination module 204 identifies that the current advancing time is not greater than a first advancing threshold, the speed determination module 204 adds an incremental advancing time to the current advancing time. The incremental advancing time may be stored in a register. In an embodiment of the invention, the incremental advancing time may be stored in a memory address in a common memory 212. Illustratively, if the incremental advancing time is 20 microseconds, then the new advancing time is 50 microseconds.

The countdown commutation time and the new anticipated fan speed (FIG. 3(*a*)) or calculated fan speed (FIG. 3(*b*)) are then calculated utilizing the new advancing time and anticipated fan speed or calculated fan speed. The speed determination module 204 transmits the anticipated fan speed or calculated fan speed and the new advancing time to the advancing analyzation module 206. The advancing analyzation module 206 calculates the countdown commutation value by subtracting the new advancing time from the anticipated fan speed or calculated fan speed. The advancing analyzation module 206 alerts the commutation output module 208 to switch outputs.

The speed determination module 204 determines if the current advancing time is greater than a first advancing threshold. If the current advancing time is greater than the advancing time threshold, then initialization is complete.

During operation of the cooling fan where the current advancing time is greater than the first advancing threshold, the speed determination module 204 may receive either the anticipated fan speed, in the embodiment illustrated in FIG. 3(*a*), or the calculated fan speed, in the embodiment illustrated in FIG. 3(*b*). The speed determination module 204 may transmit the speed to the advancing analyzation module 206. The advancing analyzation module 206 may determine if the anticipated fan speed or the calculated fan speed is above an efficient speed threshold. If the advancing analyzation module 206 determines that the anticipated fan speed or the calculated fan speed is below the efficient speed threshold, the advancing analyzation module 206 determines if the fan is stopped or in a locked rotor condition. If the advancing analyzation module 206 identifies that the cooling fan is stopped or in a locked rotor condition, the initialization process for the fan begins. In other words, the cooling fan is reset. If the advancing analyzation module 206 determines that the fan is not stopped or in a locked rotor condition, then the current advancing time is decremented by a second pre-determined amount.

The advancing analyzation module 206 calculates the commutation countdown time utilizing the supplied variables, e.g., calculated fan speed and current advancing amount; calculated fan speed and decremented advancing amount; anticipated fan speed and current advancing amount, etc. The advancing analyzation module 206 transmits this commutation value to a first counter 216 which times the elapsing of the countdown commutation time. After the countdown commutation time has elapsed, a signal is sent from the advancing analyzation module 206 to the commutation output module 208, which enables the outputs from the microcontroller to be commutated.

As described above, in one embodiment of the invention, after commutation, or switching of the outputs, the commutation output module 208 may transmit a signal to a counting module 216 to initiate a measurement of an actual advance time. The speed determination module 204 receives a speed sensor interrupt from the speed sensor 117. The speed determination module 204 transmits a notification to the advanced analyzation module 206 identifying that the next speed sensor interrupt has been received. The advanced analyzation module 206 receives the speed sensor interrupt notification from the speed determination module 204 and notifies the counting module 210 to stop the measuring of the actual advance time. The advanced analyzation module 206 adds the commutation countdown value and the actual fan speed which results in the new anticipated fan speed.

In an embodiment of the invention, the speed determination module 204 may receive the next speed sensor interrupt and may determine the calculated fan speed based on the timing of the next speed sensor interrupt and the previous speed sensor interrupt. In this embodiment the speed determination module may utilize the second counting module 218, as illustrated in FIG. 3(*b*).

Figure 4A:
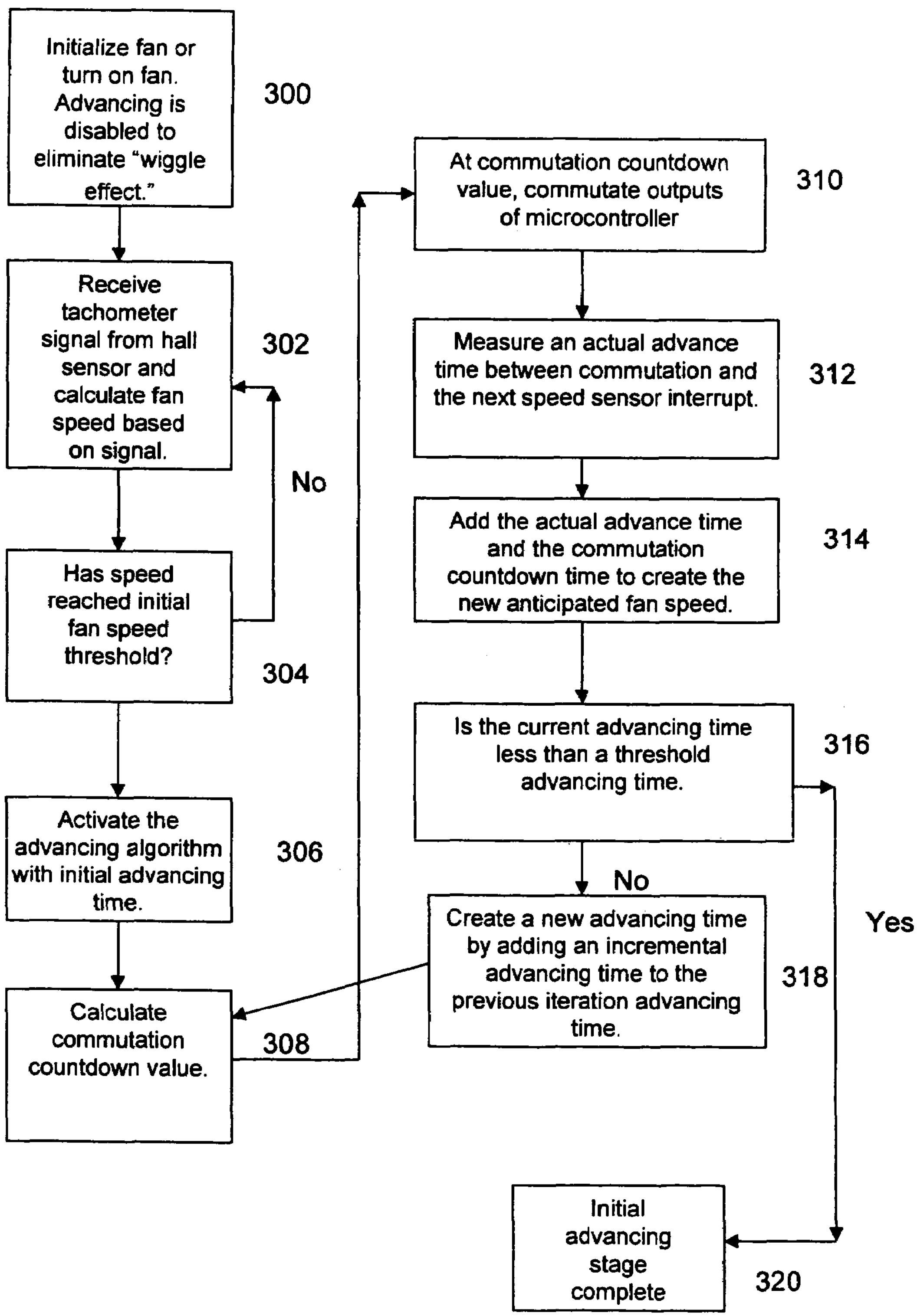
FIG. 4(*a*) illustrates a flowchart for the initialization stage for driving a motor according to an embodiment of the present invention.
Figure 4B:
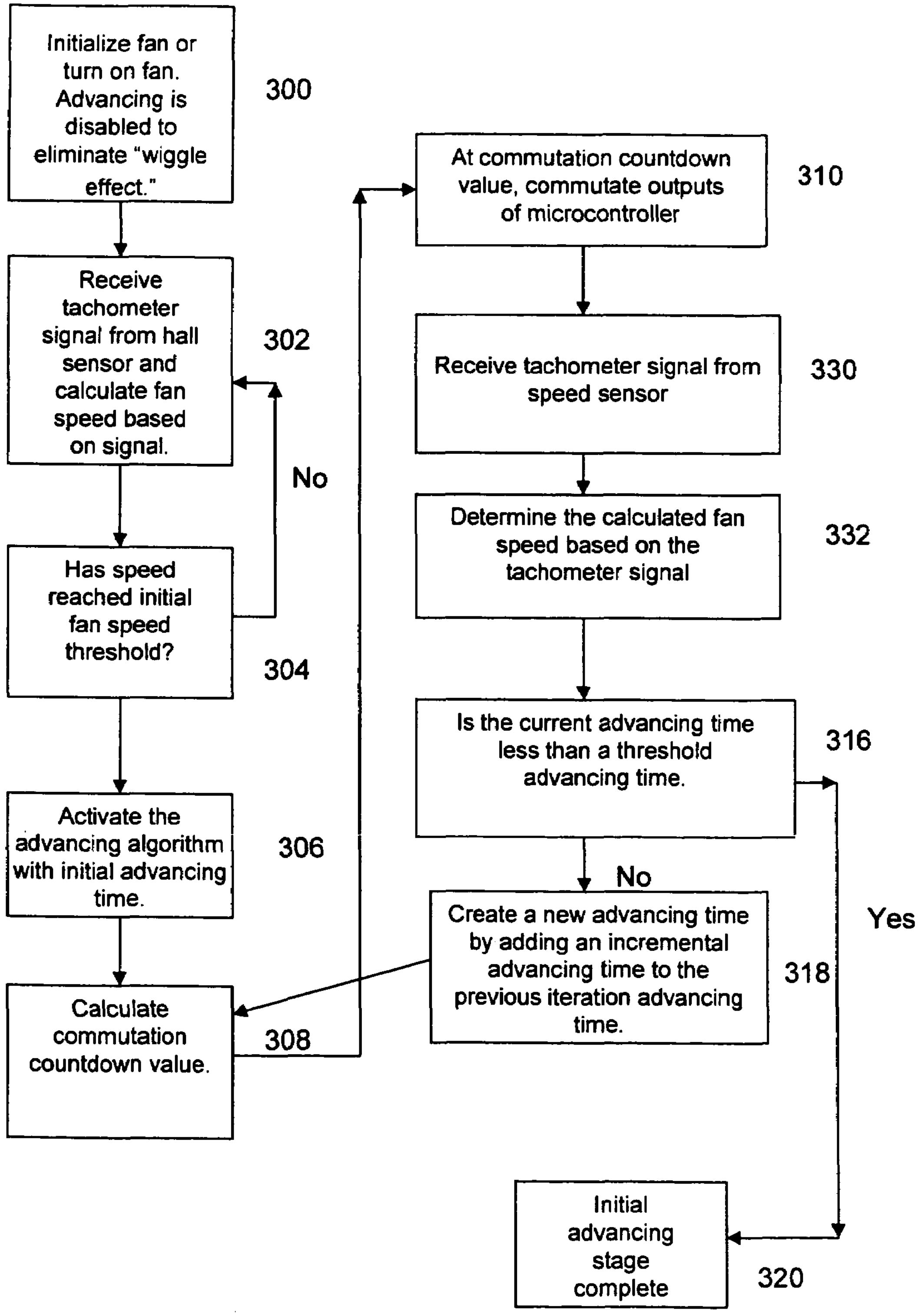

FIG. 4 illustrates a flowchart for the initialization stage of a motor driven device according to an embodiment of the present invention. In this illustration, a cooling fan is the motor driven device. In other embodiments of the invention, other devices may be driven by a motor and the motor speed may be monitored. For ease of illustration, this description utilizes fan speed, but motor speed may be substituted for fan speed. The cooling fan is initialized and the fan is turned on 300. The advancing modification is disabled during power-on or initialization of the fan to eliminate the "oscillating effect."

Tachometer signals are received 302 and a fan speed is calculated based on the tachometer signal from the speed sensor. In an embodiment of the invention, a fan speed is calculated by the microcontroller and may be referred to as a calculated fan speed.

The calculated fan speed is analyzed to determine 304 if the calculated speed has reached an initial fan speed threshold. In an embodiment of the invention, the pre-determined threshold may be 500 revolutions per minute (RPM). In an embodiment of the invention, the initial fan speed threshold may be 2500 RPMs. The initial fan speed threshold may be set for the fan and may identify an operating speed at which the advancing emulation produces results that enable efficient operation of the cooling fan. If the calculated speed is not above the initial fan speed threshold, the microcontroller receives a new value in the tachometer signal and calculates a fan speed based on, for example, the pulse duration or time between pulses in the tachometer signal. The microcontroller 120 continues to calculate the fan speed until the initial fan speed threshold is reached.

If the initial fan speed threshold for the fan speed is exceeded, the advancing modification is enabled 306 utilizing an initial advancing time. In an embodiment of the invention, the initial advancing time may be, for example, 20 microseconds. In an embodiment of the invention, the initial advancing time may be 25 microseconds. The initial advancing time may any value. The initial advancing time may need to be greater than the time required for the microcontroller to receive and process the speed sensor interrupt. This time which is required to receive and process the speed sensor interrupt may be referred to as the interrupt overhead. If the initial advancing time is not greater than the interrupt overhead, then the calculations made by the microcontroller may not meaningful.

A commutation countdown value is calculated 308 by the microcontroller for a certain timeframe. For example, the commutation countdown value may be calculated for ½ revolution of the fan. In another example, the commutation countdown value may be calculated for a whole revolution of the fan or a ⅓ revolution of the fan. In the first iteration of the initialization routine, the commutation countdown value may be the calculated fan speed minus the initial advancing time.

The commutation countdown value may be utilized, for example, to countdown a timer or counter within the microcontroller. Once the commutation countdown value has elapsed, the microcontroller switches outputs or commutates 310 the output signals. As described above, commutation is the switching of direction of the current that flows through coil or stator winding, which results in the switching of the stator polarities. Illustratively, this occurs when the microcontroller sends an output signal to a different driver within a driving circuit.

In one embodiment of the invention, an actual advance time is calculated 312 between the commutation of the output signals and the next received speed sensor interrupt, as illustrated in FIG. 4(*a*). The microcontroller may calculate the actual advance time. In this embodiment of the invention, an anticipated fan speed is calculated 314 by adding the actual advance time and the commutation time.

In one embodiment of the invention illustrated in FIG. 4(*b*), the tachometer signal is received 330 from the speed sensor. The calculated fan speed is determined 332 based on the tachometer signal received from the speed sensor, as illustrated in FIG. 4(*b*).

The current advancing time is compared 316 to a threshold advancing time. In an embodiment of the invention, the threshold advancing time may be 70 microseconds. In an embodiment of the invention, the threshold advancing time may range anywhere from 60–120 microseconds, depending on different motors, loads, or fan speeds required for the operation of the cooling fan.

If the current advancing time is less than the threshold advancing time, then a new advancing time is calculated 318. The new advancing time is created by adding an incremental time to the current advancing time. In an embodiment of the invention, the incremental time could be 5 microseconds. In an embodiment of the invention, the incremental time could be 10 or 20 microseconds. A new commutation countdown value is calculated utilizing the new advancing time and the anticipated fan speed or calculated fan speed and the process returns to 308.

If the current advancing time is greater than the threshold advancing time, then the initialization stage of the fan has been completed 320.

Figure 5A:
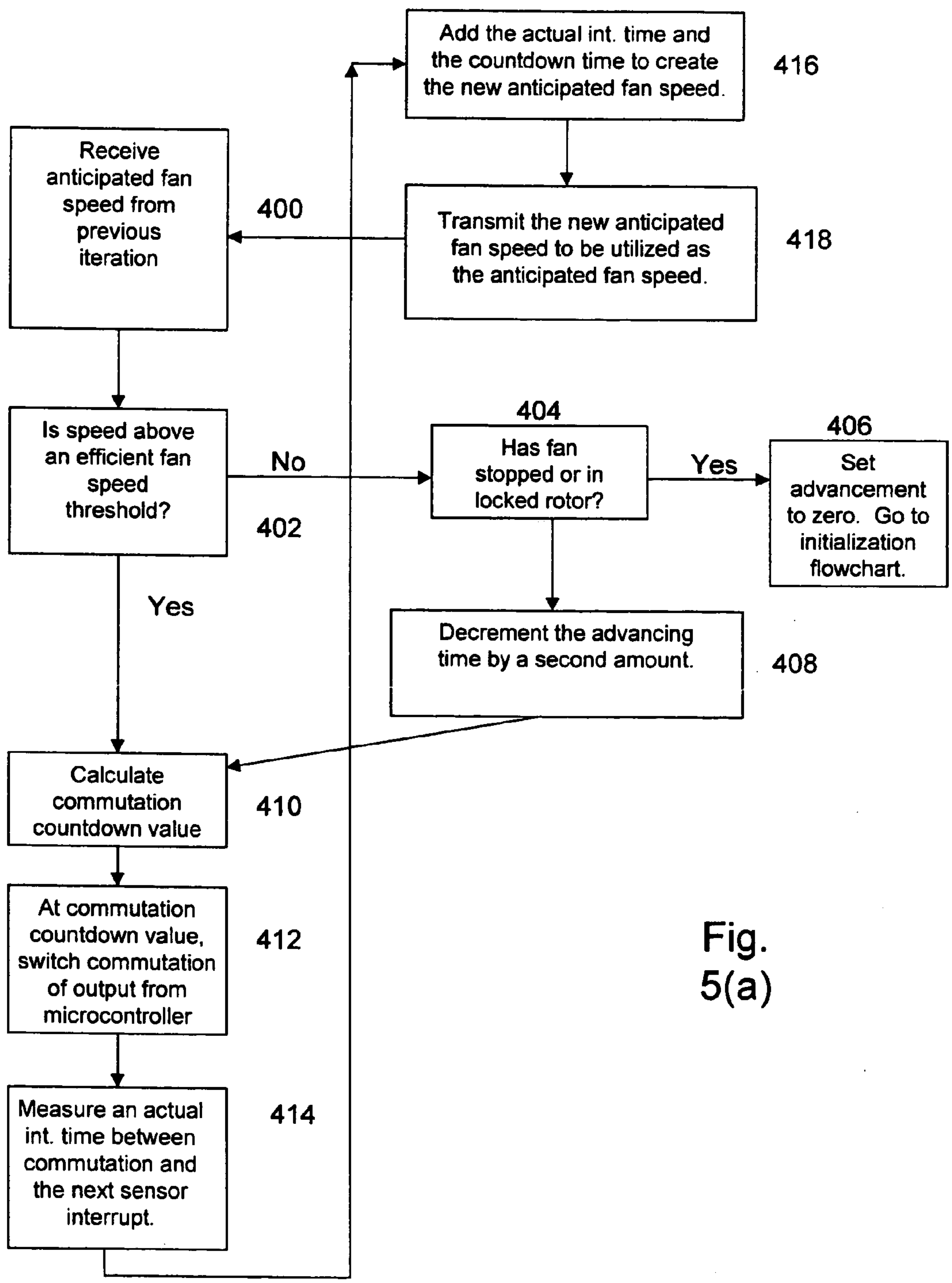
FIG. 5(*a*) illustrates a flowchart of an advancing emulation algorithm after an initialization stage according to an embodiment of the present invention.
Figure 5B:
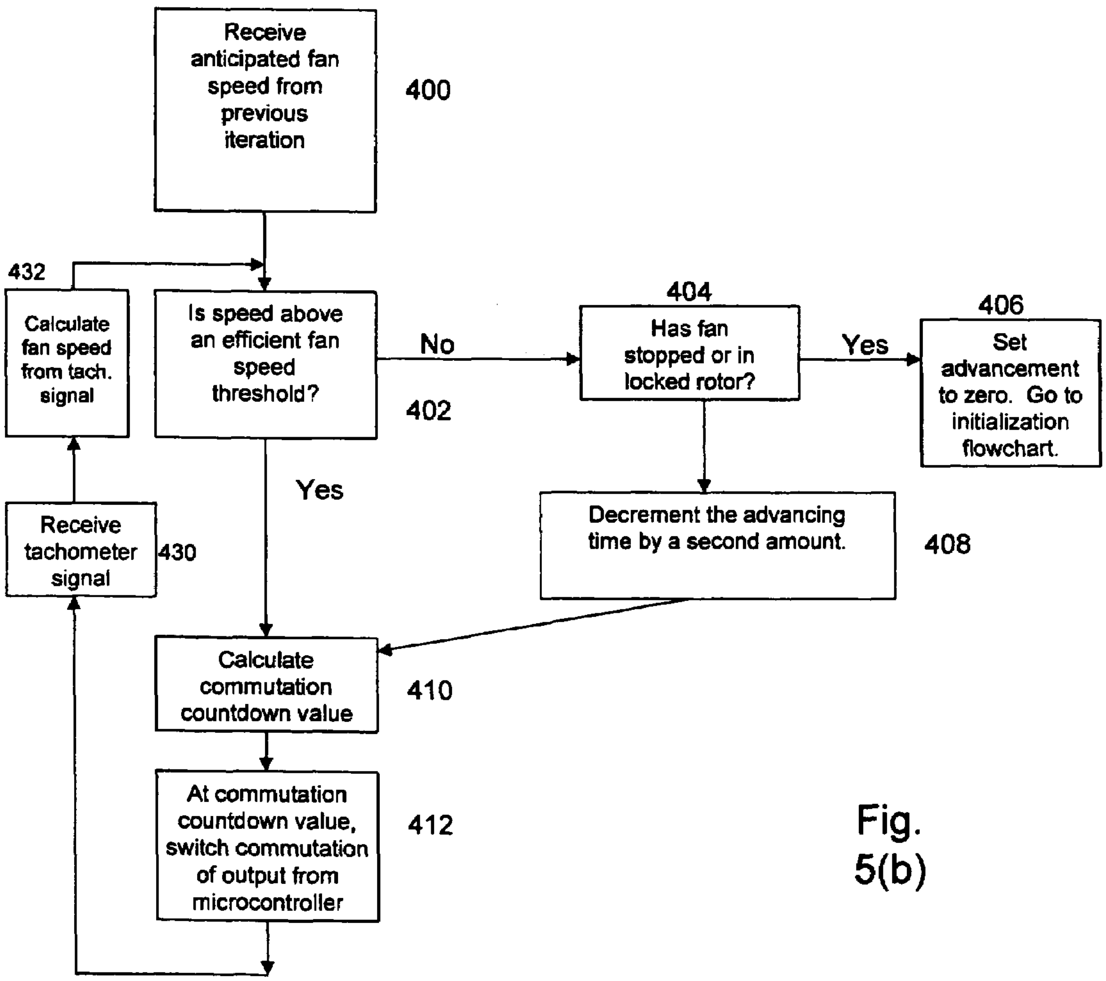

FIG. 5(*a*) illustrates a flowchart of an advancing emulation algorithm after an initialization stage utilizing an anticipated fan speed according to an embodiment of the present invention. FIG. 5(*b*) illustrates a flowchart of an advancing emulation algorithm after an initialization stage utilizing a calculated fan speed according to an embodiment of the present invention. When the fan is operating at a speed greater than the initial fan speed threshold, the anticipated fan speed (in one embodiment) and the calculated fan speed (in one embodiment) is received 400 by the microcontroller for the previous iteration of the advancing emulation and compensation.

The anticipated fan speed or calculated fan speed is verified or checked or compared 402 against an efficient fan speed threshold to verify that the fan is still operating above the speed as defined by the fan speed threshold.

If the anticipated fan speed or calculated fan speed is less than the efficient fan speed threshold, the microcontroller determines 404 whether the fan is stopped or in a locked rotor condition. If the fan is stopped, i.e., there is no fan speed or the fan is in a locked rotor condition, the microcontroller may set the current advancing time to zero. In this case, if the microcontroller is utilizing the anticipated fan speed, with the current advancing time equal to zero, the microcontroller may have to utilize the tachometer signal from the hall sensor in order to determine the next fan speed. This operation is described above with respect to FIG. 4. In an embodiment of the invention utilizing the calculated fan speed, the microcontroller may operate to determine the calculated fan speed, as illustrated in FIG. 5(*b*).

If the anticipated fan speed of calculated fan speed is below the threshold fan speed and the fan is not stopped or in a locked rotor position, the advancing time is decremented 408 by a second time amount or pre-determined decrement of time. This creates a decremented advancing time.

The countdown commutation value is calculated 410 by subtracting either the decremented advancing time (if the anticipated fan speed or calculated fan speed was not greater than the pre-determined fan speed threshold) or by utilizing the existing advancing time, e.g., in the range of 60 to 120 microseconds, (if the anticipated fan speed or calculated fan speed is greater than the pre-determined fan speed threshold and the fan is not stopped or in a locked rotor condition).

Commutation of the microcontroller outputs occurs 412 at the expiration of the countdown commutation value. Thus, illustratively, if the countdown commutation value is 375 microseconds, 375 microseconds after the last speed sensor interrupt is received, the outputs of the microcontroller are switched, e.g., the microcontroller sends the driving signal to a different driver within the driving circuit.

In an embodiment of the invention illustrated in FIG. 5(*a*), an actual advance time is calculated or measured 414 as the time between the commutation of the outputs and the next received speed sensor interrupt. In this embodiment of the invention, the actual interrupt time is added to the countdown commutation time to create 416 a new anticipated fan speed. The new anticipated fan speed becomes the current fan speed for the next calculation. The new anticipated fan speed is transferred to step 400 to be utilized in future calculations.

In the embodiment of the invention described in FIG. 5(*a*), if the anticipated fan speed continues to be lower than an efficient fan speed threshold, then the advancing time is decremented until it reaches the initial advancement time. If the fan is stopped or enters into a locked rotor condition, the advancement time will be reset to zero as it is during initialization of the fan. The process illustrated in FIG. 4 will then be enabled.

In the embodiment of the invention illustrated in FIG. 5(*b*), the process for advancement emulation and compensation is identical to the process illustrated in FIG. 5(*a*) until after the commutation of the outputs is switched. In other words, the process illustrated by steps 414, 416, and 418 in FIG. 5(*a*) is replaced with a process illustrated by steps 430 and 432 of FIG. 5(*b*). A tachometer signal is received 430 from the speed sensor. The tachometer signal is analyzed and a calculated fan speed is determined 4320 based on the tachometer signal. The calculated fan speed is then compared to the efficient fan speed threshold, as illustrated in FIG. 5(*b*). As discussed above, if the calculated fan speed is not above the efficient fan speed threshold, the process illustrated in steps 404, 406 and 408 may be executed. If the calculated fan speed is above the efficient fan speed threshold, a commutation countdown value is calculated 410 and the outputs of the microcontroller are switched 412 at the elapsing time of the commutation countdown value.

While the description above refers to particular embodiments of the present invention, it will be understood that many modifications may be made without departing from the spirit thereof. Additionally, the claims of this invention apply to microcontroller-controlled motor applications. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

The invention claimed is:

1. A method of driving a motor comprising:

calculating an emulated advancement time based on the motor's efficiency;

measuring a time for one revolution of a rotor of the motor;

subtracting the emulated advancement time from the time for the one revolution of the rotor to generate a commutation countdown time; and commutating outputs from a controller to the motor when the commutation countdown time has elapsed.

2. The method of claim 1, further including measuring an actual advance time, the actual advance time being a time between the commutating of the outputs and a receipt by the controller of a next speed sensor interrupt.

3. The method of claim 2, further including calculating an anticipated motor speed by adding the actual advance time to the commutation countdown time.

4. The method of claim 3, further including (a) calculating a new commutation countdown time by subtracting the emulated advancement time from the anticipated motor speed;

(b) commutating outputs from the controller when the new commutation countdown time has elapsed;

(c) measuring the actual advance time between the commutating of the outputs and the next speed sensor interrupt;

(d) calculating the anticipated motor speed by adding the actual advance time to the new commutation countdown time; and continuing the steps (a), (b), (c), and (d) until the anticipated motor speed is lower than a pre-determined motor speed threshold.

5. The method of claim 4, further including decrementing the emulated advancement time by a pre-determined advancement time to created a decremented emulated advancement time if the anticipated motor speed is lower than a pre-determined threshold;

calculating the new commutation countdown time by subtracting the decremented emulated advancement time from the anticipated motor speed;

commutating the outputs from the controller when the new commutation countdown time has elapsed;

measuring the actual advance time, the actual advance time being the time between the commutating of the outputs from the controller and the receipt by the controller of the next speed sensor interrupt; and calculating the anticipated motor speed by adding the actual advance time to the new commutation countdown time.

6. A method of initializing neutral commutation, comprising:

initializing a first driving signal to drive a motor;

receiving a tachometer signal from a speed sensor for the motor;

measuring a pulse time based on the received tachometer signal;

calculating a commutation countdown value by subtracting an initial advancing time from the pulse time if the calculated motor speed is lower than a minimum predetermined threshold; and commutating outputs to the motor including generating a second driving signal if the commutation countdown value has elapsed.

7. The method of claim 6, further including measuring an actual advance time as a period between the commutating of the outputs and a receipt of a next speed sensor interrupt.

8. The method of claim 7, further including creating an anticipated motor speed by adding the actual advance time to the commutation countdown time.

9. The method of claim 8, further including determining if the initial advancing time is less than a threshold advancing time.

10. The method of claim 9, further including (a) creating a new advancing time by adding an incremental advancing time to the initial advancing time if the initial advancing time is less than the threshold advancing time;

(b) calculating a new commutation countdown time by subtracting the new advancing time from the anticipated motor speed;

(c) commutating the outputs including generating the first drive signal when the new commutation countdown time has elapsed;

(d) measuring the actual advance time between the commutating of the outputs and the next speed sensor interrupt;

(e) creating a new anticipated motor speed by adding the actual advance time to the new commutation countdown time, and repeating steps (a), (b), (c), (d), and (e) until the new advancing time is greater than threshold advancing time.

11. A method of driving a motor, comprising:

calculating an advancement time based on a motor's efficiency;

utilizing a tachometer signal transmitted from a speed sensor for the motor to to measure a time between pulses of the tachometer signal;

subtracting the advancement time from the the time between pulses to generate a commutation countdown time; and commutating outputs from a controller to the motor when the commutation countdown time has elapsed.

12. The method of claim 11, further including (a) utilizing the tachometer signal transmitted from the speed sensor at a new measurement time to measure a new time between pulses, (b) calculating a new commutation countdown time by subtracting the advancement time from the new time between pulses;

(c) commutating outputs to the motor from the controller when the new commutation countdown time has elapsed; and continuing the steps (a), (b), and (c) until the new time between pulses is lower than a pre-determined threshold.

13. A method of initializing neutral commutation, comprising:

initializing a first driving signal to drive a motor;

receiving a tachometer signal from a speed sensor for the motor;

calculating a time between pulses of a tachometer signal based on the received tachometer signal;

calculating a commutation countdown value by subtracting an initial advancing time from the time between pulses of the tachometer signal if the time between pulses of the tachometer signal is lower than a minimum pre-determined threshold; and commutating outputs to the motor, including generating a second driving signal, if the commutation countdown value has elapsed.

14. The method of claim 13, further including determining if the initial advancing time is less than a threshold advancing time.

15. The method of claim 14, further including (a) creating a new advancing time by adding an incremental advancing time to the initial advancing time if the initial advancing time is less than the threshold advancing time;

(b) calculating a new commutation countdown time by subtracting the new advancing time from the time between pulses in the tachometer signal;

(c) commutating the outputs to the motor, including generating the first drive signal when the new commutation countdown time has elapsed, and repeating steps (a), (b), and (c) until the new advancing time is greater than threshold advancing time.

16. A microcontroller to drive a motor, comprising:

a determination module to receive a tachometer signal from a speed sensor for the motor, to to determine a time between pulses of the tachometer signal from the tachometer signal, and to transmit the time between pulses of the tachometer signal;

an advancing analyzation module to receive the time between pulses of the tachometer signal, to calculate a commutation countdown time by subtracting an advancement time from the time between pulses of the tachometer signal, and to transmit the commutation countdown time, a counting module to receive the commutation countdown time, and to transmit a commutation signal once the commutation countdown time has expired; and a commutation output module to receive the commutation signal and to switch outputs of the microcontroller to the motor upon receipt of the commutation signal.

17. The microcontroller of claim 16, wherein the commutation output module notifies the advancing analyzation module that the outputs to the motor are switched, the advancing analyzation module transmits a second signal to the counting module to begin an actual advance count, the speed determination module transmits a signal identifying that a next speed sensor interrupt has been received, and the counting module stops the actual advance count upon receipt of the next speed sensor interrupt.

18. The microcontroller of claim 17, wherein an anticipated motor speed is calculated by adding the commutation countdown time and the actual advance count.

19. The microcontroller of claim 17, further including, after the commutation of the microcontroller outputs, the determination module determining the time between the pulses of the tachometer signal for a new measurement time, and transmitting the time between the pulses of the tachometer signal for the new measurement time to the advancing analyzation module; and the advancing analyzation module calculating the commutation countdown time for the new measurement time by subtracting the advance time from the time between the pulses of the tachometer signal.

20. The microcontroller of claim 19, wherein the determination module utilizes a second counting module to determine the time between the pulses of the tachometer signal for the new measurement time.

21. A device, comprising:

a driving device to receive a driving signal and to transmit the driving signal;

a motor to receive the driving signal and to operate the device based on the driving signal;

a speed sensor to monitor the speed of the motor and to transmit a tachometer signal; and a microcontroller to receive the tachometer signal and to generate the driving signal, including, a speed determination module to receive the tachometer signal from the speed sensor, to measure a time between pulses of the tachometer signal, and to transmit the time between the pulses of the tachometer signal;

an advancing analyzation module to receive the time between the pulses of the tachometer signal, to calculate a commutation countdown time by subtracting an advancement time from the time between the pulses of the tachometer signal, and to transmit the commutation countdown time, a counting module to receive the commutation countdown time, and to transmit a commutation signal once the commutation countdown time has expired; and a commutation output module to receive the commutation signal and to switch outputs of the driving signal generated by the microcontroller upon receipt of the commutation signal.

22. The device of claim 21, wherein the commutation output module notifies the advancing analyzation module that the outputs are switched, the advancing analyzation module transmits a second signal to the counting module to begin an actual advance count, the speed determination module transmits a signal identifying that a next speed sensor interrupt has been received, and the counting module stops the actual advance count upon receipt of the next speed sensor interrupt.

23. The device of claim 22, wherein an anticipated motor speed is calculated by adding the commutation countdown time and the actual advance count.

24. The device of claim 21, further including, after commutation of the microcontroller outputs, the determination module determining the time between the pulses of the tachometer signal for a new measurement time, and transmitting the time between the pulses of the tachometer signal for the new measurement time to the advancing analyzation module, and the advancing analyzation module calculating the commutation countdown time for the new measurement time by subtracting the advance time from the time between the pulses of the tachometer signal.

25. A computer-readable medium having encoded thereon a computer-readable program code which when executed causes a microcontroller to:

calculate an emulated advancement time based on a motor's efficiency;

measure a time for one revolution of a rotor of the motor;

subtract the emulated advancement time from the time for the one revolution of the rotor to generate a commutation countdown time; and commutate outputs from a controller when the commutation countdown time has elapsed.

26. The computer readable medium of claim 25, having encoded thereon computer readable program code, which when executed causes the microcontroller to measure an actual advance time, the actual advance time being a time between the commutating of the outputs and a receipt by the controller of a next speed sensor interrupt.

27. The computer readable medium of claim 26, having encoded thereon computer readable program code, which when executed causes the microcontroller to calculate an anticipated motor speed by adding the actual interrupt time to the commutation countdown time.

28. A computer-readable medium having encoded thereon computer-readable program code which when executed causes a microcontroller to:

initialize a first driving signal to drive a motor;

receive a tachometer signal from a speed sensor for the motor;

calculate a time between pulses of the tachometer signal based on the received tachometer signal;

calculate a commutation countdown value by subtracting an initial advancing time from the time between the pulses of the tachometer signal if the time between the pulses of the tachometer signal is lower than a minimum pre-determined threshold; and commutate outputs for the motor, including generating a second driving signal if the commutation countdown value has elapsed.

29. The computer-readable medium of claim 28 having encoded thereon computer-readable program code, which when executed causes the microcontroller to measure an actual advance time as a period between the commutating of the outputs and a receipt of a next speed sensor interrupt.

30. The computer-readable medium of claim 29 having encoded thereon computer readable program code, which when executed causes the microcontroller to create an anticipated motor speed by adding the actual advance time to the commutation countdown time.

* * * * *